United States Patent [19]

Akers

[11] 4,364,554
[45] Dec. 21, 1982

[54] CONVEYOR ARRANGEMENT FOR MAIL SORTING MACHINES

[75] Inventor: Roy Akers, Johnson County, Kans.

[73] Assignee: Bell & Howell Company, Chicago, Ill.

[21] Appl. No.: 228,386

[22] Filed: Jan. 26, 1981

[51] Int. Cl.³ .............................................. B65H 5/02
[52] U.S. Cl. .................................. 271/272; 271/198; 271/277
[58] Field of Search ............... 271/277, 198, 272, 274, 271/275; 198/626–628, 699

[56] References Cited

U.S. PATENT DOCUMENTS

| | | |
|---|---|---|
| 814,943 | 3/1906 | Cook . |
| 823,892 | 6/1906 | Parker . |
| 874,982 | 12/1907 | Horton . |
| 979,200 | 12/1910 | Prosser . |
| 1,484,248 | 2/1924 | Austin . |
| 1,770,099 | 7/1930 | D'Humy ............................ 271/275 |
| 1,773,321 | 8/1930 | Schaffner . |
| 2,400,667 | 5/1946 | Toews . |
| 2,575,813 | 11/1951 | Hutchins . |
| 2,784,835 | 3/1957 | Dixon . |
| 2,815,850 | 12/1967 | Davis . |
| 2,909,271 | 10/1959 | Taylor . |
| 2,925,165 | 2/1960 | Rake . |
| 3,124,231 | 3/1964 | Ott ................................. 198/628 X |
| 3,237,757 | 3/1966 | Perkins . |
| 3,253,692 | 5/1966 | Ota . |
| 3,661,245 | 5/1972 | Mol . |
| 3,841,471 | 10/1974 | Mead . |
| 3,857,478 | 12/1974 | Meeusen . |
| 4,170,288 | 10/1979 | Mebus ............................ 198/627 X |

*Primary Examiner*—Richard A. Schacher
*Attorney, Agent, or Firm*—Kokjer, Kircher, Bradley, Wharton, Bowman & Johnson

[57] ABSTRACT

A double belt conveyor for a high speed mail sorting machine. The belts are arranged with confronting surfaces thereof spaced apart in vertical planes to convey mail articles in a vertical orientation. The belts have flexible fingers which deform to accommodate mail articles of varying thickness between the belts.

7 Claims, 4 Drawing Figures

U.S. Patent  Dec. 21, 1982  4,364,554
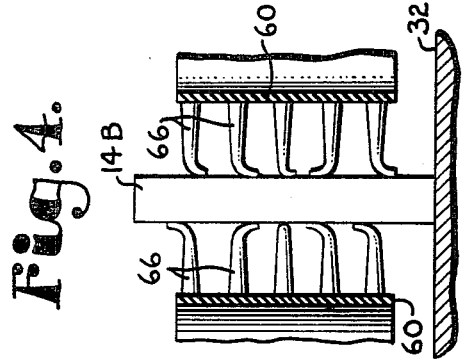
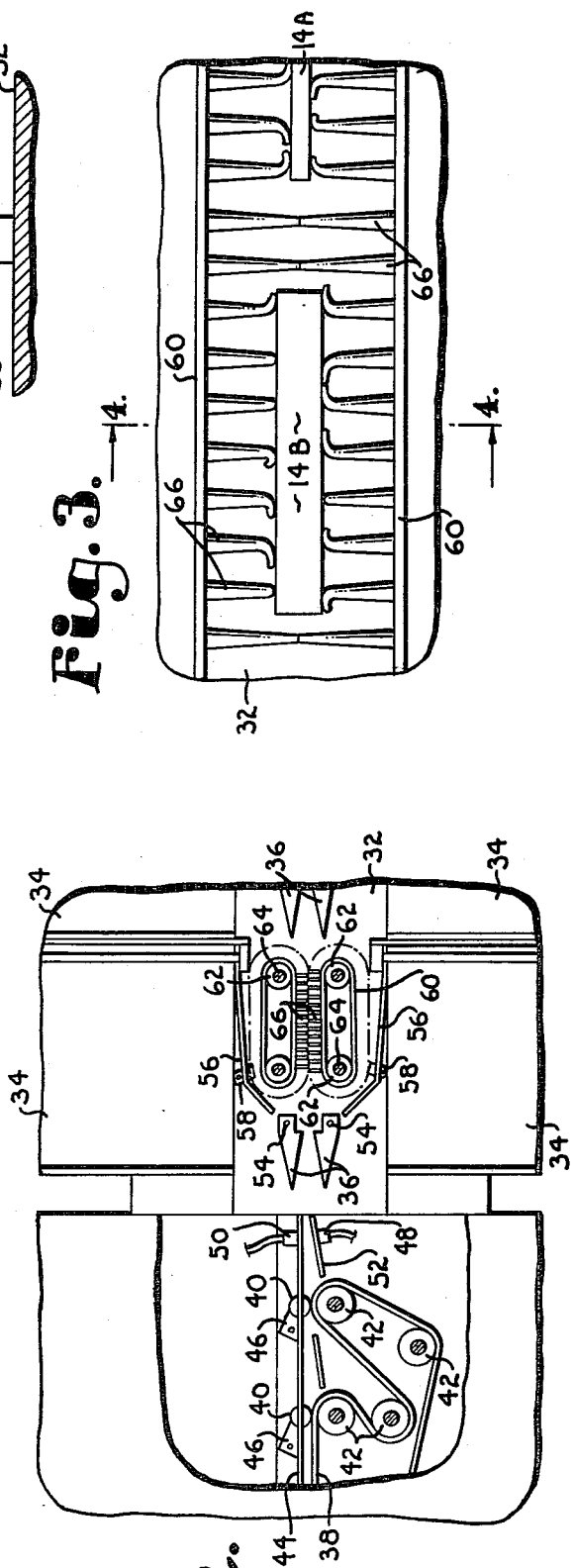
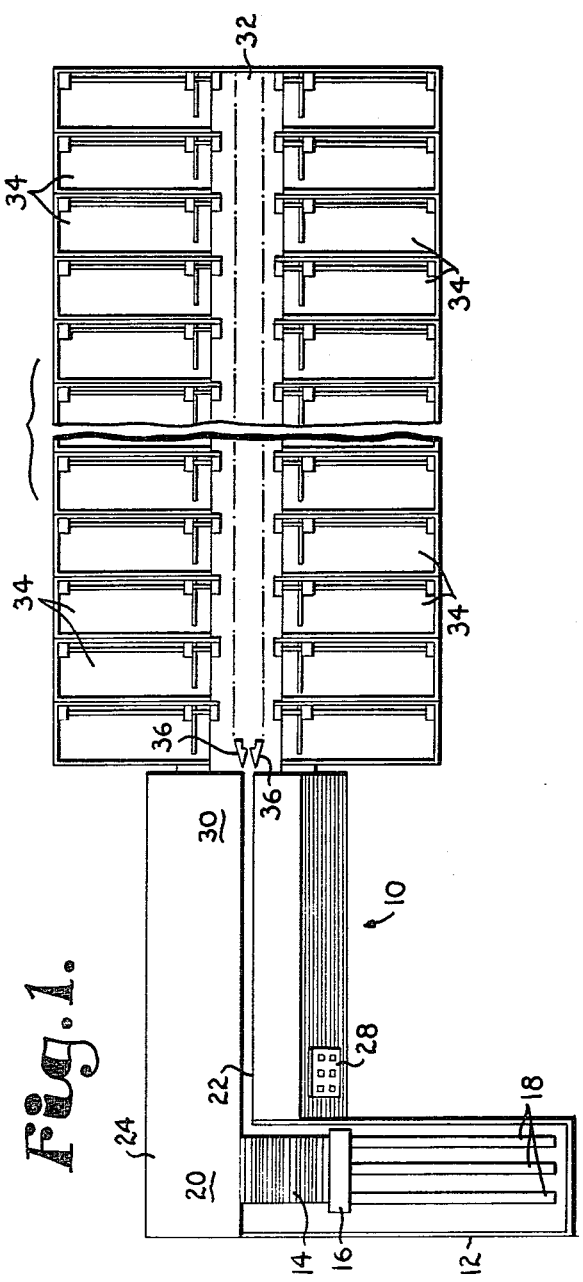

CONVEYOR ARRANGEMENT FOR MAIL SORTING MACHINES

BACKGROUND AND SUMMARY OF THE INVENTION

This invention relates in general to the field of mail handling equipment and deals more particularly with a conveyor for transporting mail articles in an automatic mail sorting machine.

One of the problems associated with high speed automatic mail sorting equipment is to effectively handle and convey mail items which vary significantly in size and especially in width. For example, a typical batch of mail may include articles which vary in width between standard business envelopes and catalogs which may be ¾ inch thick or more. If the mail sorting machine is to function effectively, it must be able to easily handle items of such diverse size and transport them to the proper sorting bins.

Co-pending patent application Ser. No. 973,926 which was filed on Dec. 28, 1978 in the name of Roy Akers discloses a high speed mailing sorting machine equipped with conveyors that have proven to be effective in conveying envelopes through the machine. The sorting function of the machine requires that the mail items be maintained in a vertical orientation as they are picked off of the envelope supply, transported through the read station and directed to the appropriate sorting bins. The present invention provides an improved conveyor which can be used in a machine of this type and which is specially constructed to convey mail items that vary widely in thickness.

Thus, it is the primary object of the invention to provide, in a mail sorting machine, a conveyor which is capable of conveying mail items of various thickness while maintaining them in a vertical orientation. The flexible fingers on the conveyor belts can be flexed sufficiently to accommodate relatively thin articles such as envelopes, as well as thick articles such as catalogs and the like. At the same time, the fingers apply enough pressure on the surfaces of the mail articles to convey them effectively along the machine.

Another object of the invention is to provide a conveyor of the character described which is suitable for use in various types of mail sorting machines and at various locations on the machine. Although the conveyor is primarily intended for use in high speed machines such as that shown in the aforementioned Akers application, it can also be used in other types of machines. Furthermore, the conveyor can be installed at various locations on the machine and is particularly effective in conveying the mail articles from the read station of the machine to the sorting bins.

An additional object of the invention is to provide a conveyor of the character described which is simple and economical to construct and effective and reliable in operation.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith and in which like reference numerals are used to indicate like parts in the various views:

FIG. 1 is a top plan view of a mail sorting machine which is equipped with a double belt conveyor constructed according to a preferred embodiment of the present invention, the break lines indicating continuous length;

FIG. 2 is a fragmentary top plan view on an enlarged scale of the conveyor and associated components, with portions broken away for illustrative purposes;

FIG. 3 is a fragmentary top plan view on a still larger scale showing the confronting surfaces of the two belts included in the conveyor; and FIG. 4 is a fragmentary sectional view taken generally along line 4—4 of FIG. 3 in the direction of the arrows.

Referring now to the drawing in more detail and initially to FIG. 1, reference numeral 10 generally designates an automatic high speed mail sorting machine. The machine 10 may be of the type shown in co-pending patent application Ser. No. 973,926, filed Dec. 28, 1978, in the name of Roy Akers, which is incorporated herein by reference.

As described in the above referenced patent application, the mail sorting machine 10 includes a magazine 12 which receives the supply of mail items to be sorted. The mail items are designated collectively by reference numeral 14 in FIG. 1. They are arranged such that they are continuously maintained in a vertical orientation and are picked off one by one from the supply stack and transported individually along the machine. The magazine 12 includes a carriage 16 which rides on three belts 18. The carriage engages the last envelope in the envelope supply 14 and thus forces the envelope supply 14 toward a pickup station 20 of the machine.

At the pickup station 20, the leading envelope in the supply is picked off and transported in a vertical position through a guideway 22 formed between a pair of panels 24 and 26. An operator is normally stationed at a control console 28 adjacent panel 26. At a read station 30, zip codes or other coded indicia imprinted on the mail articles are read. From the read station 30, the envelopes move into the sorting section of the machine which includes a horizontal table 32 extending between a plurality of sorting bins 34 located on both sides of the table. Each bin 34 is associated with a deflector gate 36 (only the first pair of gates being shown in FIG. 1). Under the control of the code reading instrument at the read station, gates 36 serve to deflect the mail articles into the appropriate bin.

Referring now more particularly to FIG. 2, the mail sorting machine includes, downstream of the reading device (not shown), a conveyor belt 38 and a pair of cooperating rollers 40 which transport the mail articles in a vertical position from the read station 30 onto table 32. Belt 38 is drawn tightly around a plurality of pulleys 42, at least one of which is driven to drive the belt in a forward direction against the front surface of the mail article. Rollers 40 are spaced apart from one another beneath a guide plate 44 located behind the belt 38. Each roller 40 is carried on a pivotal bracket 46 which is continuously urged by a spring (not shown) in a direction to bias rollers 40 toward belt 38. The rollers 40 are thus forced against the back surface of each mail article to assist belt 38 in conveying it toward the sorting bins.

A light source 48 directs a beam of light toward a photosensor 50 which is mounted to the guide plate 44. The light source 48 is supported on a small plate 52 which is spaced forwardly of plate 44 to form a guideway for directing the mail articles toward the first pair of deflector gates 36. The light reaching photosensor 50 is intermittently interrupted by a passing mail article, and the photosensor thus monitors the progress of the mail articles and informs the control circuitry each time an article approaches the sorting section of the machine.

Each deflector gate 36 is mounted on a vertical shaft 54 which may be rotated to pivot the gate inwardly against the opposing gate to close off the gap normally present between the gates. This occurs under the control of the circuitry and serves to deflect the approaching mail item into the corresponding sorting bin 34. Each bin has a guide plate 56 and a rectangular roller member 58 which assist in directing the mail articles into the bins.

As thus far described, the mail sorting machine is identical to the machine disclosed in the aforementioned Akers patent application. In accordance with the present invention, an improved double belt conveyor is provided to convey the mail articles along table 32 from each set of deflector gates 36 to the next set of gates.

With continued reference to FIG. 2, each conveyor includes a pair of endless belts 60 which are identical to one another. Each belt is tightly drawn around a pair of rollers 62 which are carried on vertical shafts 64. The shafts 64 are supported for rotation on the frame of the machine, and one shaft in each pair is rotatively driven by a conventional electric motor (not shown) in a direction such that the confronting surfaces of the belts move in the same direction away from the read station 30. Belts 60 are supported on the machine for movement with confronting surfaces of the opposed belts oriented in vertical planes spaced apart from one another a distance somewhat greater than the widest mail articles handled by the machine. A conveyor path is thus formed between the confronting surfaces of the conveyor belts 60 and on top of the underlying table 32.

Each conveyor belt 60 is provided with a plurality of flexible fingers 66 which are spaced apart from one another and which project outwardly from the belt surface. As best shown in FIG. 3, the free tips of the fingers 66 on the confronting surface of each belt are located adjacent the tips of the fingers carried on the confronting surface of the opposed belt. Each finger 66 preferably tapers from its base, located adjacent the belt, to its free tip portion. The fingers are flexible enough to deform in flexed fashion when an article of mail is received between the belts. The fingers are resilent such that when deformed, they frictionally engage the opposite surfaces of the mail articles in order to convey them from one set of gates 36 to the next set of gates.

It is to be understood that there is one double belt conveyor located between each pair of deflection gates 36, although only one of the conveyors is shown in the drawing.

In use, the articles of mail are conveyed one by one to the initial pair of gates 36 and, if both gates are open, to the next pair of gates until finally one of the gates is closed to deflect the article into the corresponding sorting bin. As each mail article enters the space between the two belts 60, the flexible fingers 66 are displaced and bear against its opposite sides to convey it along the conveyor path with the article maintained in a vertical orientation and its bottom edge on the table surface 32 (see FIG. 4). The conveyor discharges the mail article into the space presented between the next set of gates or into the appropriate bin if one of the gates is closed.

As best illustrated in FIG. 3, the conveyor is constructed to readily handle mail articles varying in width from standard business envelopes 14A to catalogs 14B which may be ¾ inch thick or more. The fingers are able to deform sufficiently to accommodate the catalog 14B while providing considerable force against its opposite sides due to the extent of the deformation. The fingers 66 are deformed to a lesser extent when handling thinner items such as envelope 14A. Accordingly, thicker articles which are usually relatively heavy are engaged by the fingers with considerable force, while lesser force is applied to the thinner and lighter articles due to the reduced flexing of the fingers. The overall result is that the conveyor readily accommodates various sized mail items while effectively conveying them along the conveyor path as intended.

In actual practice, it is contemplated that the flexible fingers 66 will be formed on strips of material which are then bonded to the surface of each conveyor belt. It is also contemplated that the tips of the opposing fingers will either be touching or perhaps even overlap slightly in order to accommodate even the thinnest envelopes. It is to be understood that the conveyor can be located at various positions on the mail sorting machine in addition to the position shown and described herein.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, I claim:

1. In a mail sorting machine for handling both relatively wide and relatively narrow articles of mail with the mail articles transported on the machine in a substantially vertical orientation, a conveyor arrangement comprising:

a pair of endless belts each having a plurality of flexible fingers projecting outwardly therefrom, said fingers being spaced apart from one another across the width and along the length of each belt;

means for supporting said belts on the machine with confronting surfaces of the belts oriented in substantially parallel vertical planes spaced apart at least as far as the thickness of the wide mail articles to provide a conveyer path for the mail articles between said confronting surfaces of the belts, said support means locating the tips of the fingers on each confronting surface adjacent the tips of the fingers on the opposed confronting surface to engage with opposing fingers the opposite sides of the relatively narrow mail articles located between said confronting surfaces of the belts;

a stationary support surface on the machine underlying said confronting surfaces of the belts, said support surface being oriented substantially horizontally to receive the lower edge portion of each mail article travelling along said conveyer path; and drive means for driving said belts to move said confronting surfaces in the same generally horizontal direction to convey the mail articles along said conveyor path in a substantially vertical orientation, said fingers being flexed against opposite sides of the mail articles to convey both the wide and narrow mail articles along said path with the lower edge portions of the mail articles moving along said support surface.

2. The invention set forth in claim 1, wherein said support means includes a pair of rollers for each belt around which the belt is tightly drawn, said drive means being operable to rotate at least one roller in each pair.

3. The invention set forth in claim 1, wherein each finger has a tapered configuration.

4. A conveyor arrangement as set forth in claim 1, wherein each finger projects from the corresponding belt a distance of approximately half the distance between the confronting surfaces of said belts.

5. A conveyor arrangement for a mail sorting machine which handles both relatively wide and relatively narrow articles of mail, said conveyor arrangement comprising:

a pair of endless belts;

a pair of rollers for each belt supported on the machine for rotation about generally vertical axes, each belt being tightly drawn around the corresponding pair of rollers to support the belts with confronting surfaces thereof oriented in substantially parallel vertical planes spaced apart a distance at least as great as the thickness of the wide mail articles;

a generally horizontal support surface on the machine underlying said confronting surfaces of the belts;

drive means for rotating at least one roller in each pair in a direction to carry said confronting surfaces of the belts in the same direction; and a plurality of flexible fingers projecting from each belt and spaced apart from one another across the width and along the length of each belt, the fingers on each confronting surface having tips located adjacent the tips of the fingers on the opposed confronting surface to contact opposite sides of relatively thin mail articles with the tips of opposing fingers, said fingers flexing against opposite sides of both the wide and narrow mail articles to convey the mail articles individually along said support surface in a substantially vertical orientation in response to driving of the belts.

6. A conveyor arrangement as set forth in claim 5, wherein each finger has a tapered configuration.

7. A conveyor arrangement as set forth in claim 5, wherein each finger projects from the corresponding belt a distance of approximately half the distance between the confronting surfaces of said belts.

* * * * *